United States Patent [19]

Matsui et al.

[11] Patent Number: 5,239,336
[45] Date of Patent: Aug. 24, 1993

[54] CAMERA AND SYSTEM OF CAMERA AND ELECTRONIC FLASH DEVICE

[75] Inventors: Hideki Matsui; Nobuyoshi Hagiuda, both of Yokohama; Ryotaro Takayanagi, Yokosuka; Norikazu Yokonuma, Tokyo; Hiroshi Sakamoto, Kawasaki, all of Japan

[73] Assignee: Nikon Corporation, Tokyo, Japan

[21] Appl. No.: 802,604

[22] Filed: Dec. 5, 1991

[30] Foreign Application Priority Data

Dec. 21, 1990 [JP] Japan ................................ 2-412771

[51] Int. Cl.⁵ .............................................. G03B 15/05
[52] U.S. Cl. ..................................... 354/416; 354/137
[58] Field of Search ............... 354/420, 416, 417, 137, 354/138, 413

[56] References Cited

U.S. PATENT DOCUMENTS 4,422,743 12/1983 Izumi et al. ..................... 354/416 X
4,717,934 1/1988 Kobayashi et al. ................. 354/415
5,075,714 12/1991 Hagiuda .............................. 354/416

Primary Examiner—Russell E. Adams
Assistant Examiner—Jae N. Noh
Attorney, Agent, or Firm—Shapiro and Shapiro

[57] ABSTRACT

A camera system includes a camera having a focal plane shutter and an electronic flash device cooperable with the camera. The flash device, which emits light repetitively, has two operating modes. In a first mode, a light emission start signal is synchronized with the start of the exposure of a film exposure area by a leading curtain of the shutter, and a light emission stop signal is synchronized with the end of the exposure of the film exposure area by a trailing curtain of the shutter. In a second mode, the light emission start signal is synchronized with the full exposure of the film exposure area by the leading curtain, and the light emission stop signal is synchronized with the start of shielding of the film exposure area by the trailing curtain.

3 Claims, 3 Drawing Sheets

CAMERA AND SYSTEM OF CAMERA AND ELECTRONIC FLASH DEVICE

BACKGROUND OF THE INVENTION

1. Field of the Invention

The present invention relates to a technique to repeatedly emit a light from a flashing light emitting tube at a high speed (high frequency) during an exposure time of a focal plane shutter camera.

2. Related Background Art

In a camera having a focal plane shutter, an exposure operation of starting the run of a shutter trailing curtain before the completion of the run of a shutter leading curtain in a film exposure area to move a slit-shaped aperture formed by the leading curtain and the trailing curtain onto the film exposure area (hereinafter referred to as a slit exposure operation) has been known. It has also been known that in the slit exposure operation, a light emitting tube of an electronic flash device starts to repeatedly emit a light at a high speed (high frequency) in response to the start of the run of the slit-shaped aperture on the film exposure area, and the repetitive light emission of the light emitting tube is stopped in response to the end of the run of the slit-shaped aperture on the film exposure area so that the light emitting tube emits the light a plurality of times during the run of the slit-shaped aperture on the film exposure area.

SUMMARY OF THE INVENTION

It is an object of the present invention to provide a camera and a camera system which properly control repetitive light emission of a light emitting tube during an exposure period in flash photographing of a focal plane shutter camera.

In order to achieve the above object in accordance with the present invention, in an exposure operation of a focal plane shutter for causing a film exposure area to a full open state (hereinafter referred to as a full open exposure operation) by a device for causing flashing light emitting means to repetitively emit a light during a film exposure period, the repetitive light emission by the flashing light emitting means is started in synchronism with a substantially full open status of the film exposure area, and the light emission by the flashing light emitting means is stopped substantially in synchronism with the start of shielding of the film exposure area by a trailing curtain.

In order to achieve the above object in accordance with the device of the present invention, in a slit exposure the start timing and the stop timing of the repetitive light emission by the flashing light emitting means for the shutter operation are different from those for the full open exposure operation.

In accordance with the present invention, the light emission by the light emitting tube is controlled to prevent non-uniform exposure to the film for both of the slit exposure and the full open exposure of the focal plane shutter.

DETAILED DESCRIPTION OF THE PREFERRED EMBODIMENT

An embodiment of the present invention is explained in detail with reference to the drawings.

Figure 1:
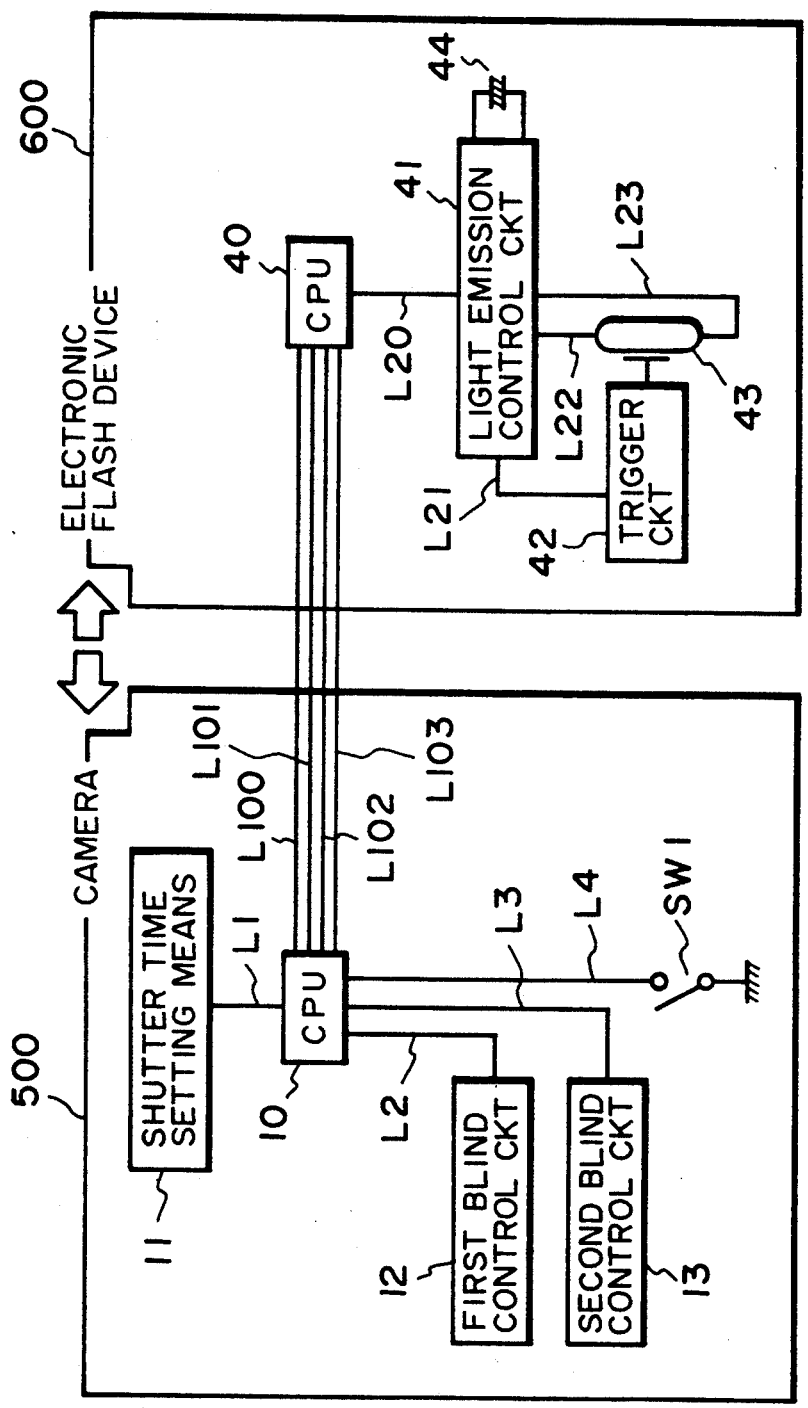
FIG. 1 shows a block diagram of an embodiment of the present invention.

In FIG. 1, numeral 10 denotes a CPU having various functions, numeral 11 denotes shutter speed setting means for setting a shutter speed, numeral 12 denotes a leading curtain drive circuit for controlling the run of a shutter leading curtain, numeral 13 denotes a trailing curtain drive circuit for controlling the run of a shutter tailing curtain. SW1 denotes a release switch for taking a photograph, L1 denotes a signal line for connecting the CPU 10 and the shutter speed setting means 11, L2 denotes a signal line for connecting the CPU 10 and the leading curtain drive circuit 12, L3 denotes a signal line for connecting the CPU 10 and the trailing curtain drive circuit, and L4 denotes a signal line for connecting the CPU 10 and the release switch SW1. Those elements are part of a camera 500.

Numeral 40 denotes a CPU having various functions, numeral 41 denotes a conventional light emission control circuit for controlling the flashing light emission, the high repetitive frequency light emission and the voltage step-up, numeral 43 denotes a light emitting tube for emitting light, numeral 42 denotes a known trigger circuit for applying a trigger voltage to the light emitting tube 43 prior to the light emission by the light emitting tube, numeral 44 denotes a main capacitor for storing light emission energy, L20 denotes a signal line for connecting the CPU 40 and the light emission control circuit 41, and L21 denotes a signal line for connecting the light emission control circuit 41 and the trigger circuit 42. The light emitting tube 43 is connected to the light emission control circuit 41 through the lines L22 and L23. Those elements are part of an electronic flash device 600. In the present embodiment, the repetition frequency of the light emission of the light emitting tube is higher than 1 KHz.

The camera 500 and the electronic flash device 600 are connected through four signal lines L100–L103. The signal line L100 is a light emission start signal line for transmitting a light emission timing from the camera 500 to the electronic flash device 600, the signal line L101 is a light emission stop signal line for transmitting a light emission stop timing from the camera 500 to the electronic flash device 600, the signal line L102 is a light emission mode identification line for transmitting a light emission mode (whether a normal flashing light emission mode or a high speed repetitive light emission mode) from the electronic flash device 600 to the camera 500, and the signal line L103 is a reference potential line. The camera 500 and the electronic flash device 600 are removably mounted to each other.

Figure 2A:
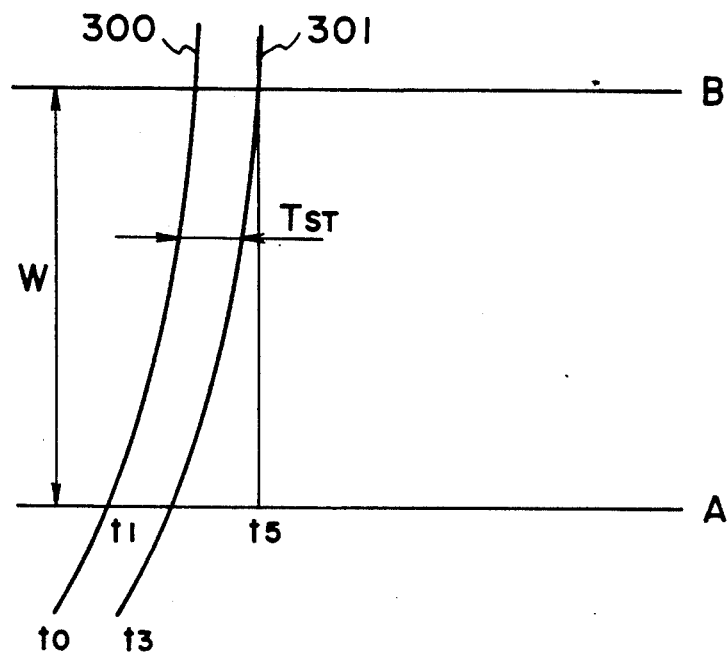
FIG. 2A shows a timing of operations of a shutter leading curtain and a shutter trailing curtain and a light emitting operation in a slit exposure operation of a camera.

In FIG. 2A, a curve 300 shows a locus of the run of the shutter leading curtain (not shown) and a curve 301 shows a locus of the shutter trailing curtain (not shown). The shutter leading curtain and trailing curtain run from A to B across a screen width W. The width A-B (W) corresponds to a film exposure area (not shown). At a time $t_0$, a leading curtain solenoid is deactivated and the run of the shutter leading curtain is started. At a time $t_1$, a light emission start signal is outputted and the light exposure to the film is started. At a time $t_3$, a trailing curtain solenoid is deactivated and the run of the shutter trailing curtain is started. At a time $t_5$, a light emission stop signal is outputted and the light exposure to the film is stopped. A time period $t_0-t_3$ corresponds to a shutter time $T_{ST}$.

Figure 2B:
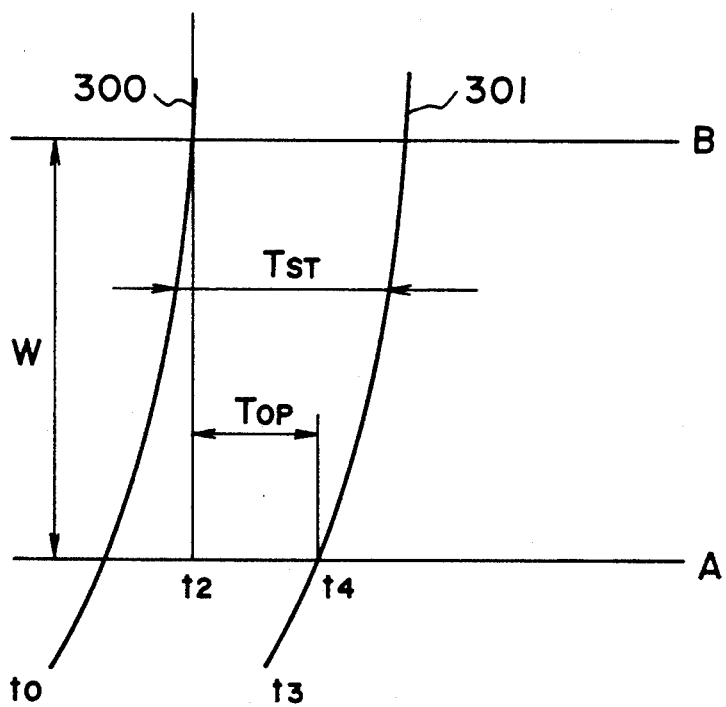
FIG. 2B shows a timing of the operations of the shutter leading curtain and the shutter trailing curtain and the light emitting operation in a full open exposure operation of the camera.

In FIG. 2B, at the time $t_0$, the leading curtain solenoid is deactivated and the run of the shutter leading curtain is started. At the time $t_2$, the light emission start signal is outputted and the light exposure to the film is started. At the time $t_2$, the full opening of the shutter leading curtain is completed. At the time $t_3$, the trailing curtain solenoid is deactivated and the run of the shutter trailing curtain is started. At the time $t_4$, the light emission stop signal is outputted and the light exposure to the film is stopped. The time period $t_2-t_4$ corresponds to a full open time $T_{OP}$ of the film.

The light emission operation of the light emission control system which is a combination of the camera 500 and the electronic flash device 600 is explained below.

When the electronic flash device 600 repeats the light emission at the high frequency, the electronic flash device 600 outputs a signal indicating the high frequency repetitive light emission to the light emission mode identification line L102. The camera 500 reads this signal and the information from the shutter speed setting means 11 into the CPU 10, and after the closure of the release switch SW1, it outputs the light emission start signal to the light emission start signal line L100 at the time $t_1$ of FIG. 2A if it is the slit exposure mode, and at the time $t_2$ of FIG. 2B if it is the full open exposure mode. When the electronic flash device 600 reads this signal into the CPU 40, it outputs the light emission start signal to the light emission control circuit 41 through the signal line L20. When the light emission control circuit 41 receives this signal, it outputs the trigger signal to the trigger circuit 42 through the signal line L21. The trigger circuit 42 applies the trigger voltage to the light emitting tube 43 by a known trigger operation in response to the trigger signal input. The light emitting tube 43 starts the high frequency repetitive light emission in response to the application of the trigger voltage. Then, the camera 500 outputs the light emission stop signal to the light emission stop signal line L101 at the time $t_5$ of FIG. 2A if it is the slit exposure mode and at the time $t_4$ of FIG. 2B if it is the full open exposure mode. When the electronic flash device reads this signal into the CPU 40, it outputs the light emission stop signal through the signal line L20. When the light emission control circuit 41 receives this signal, it stops the light emission operation of the light emitting tube 43.

Figure 3:
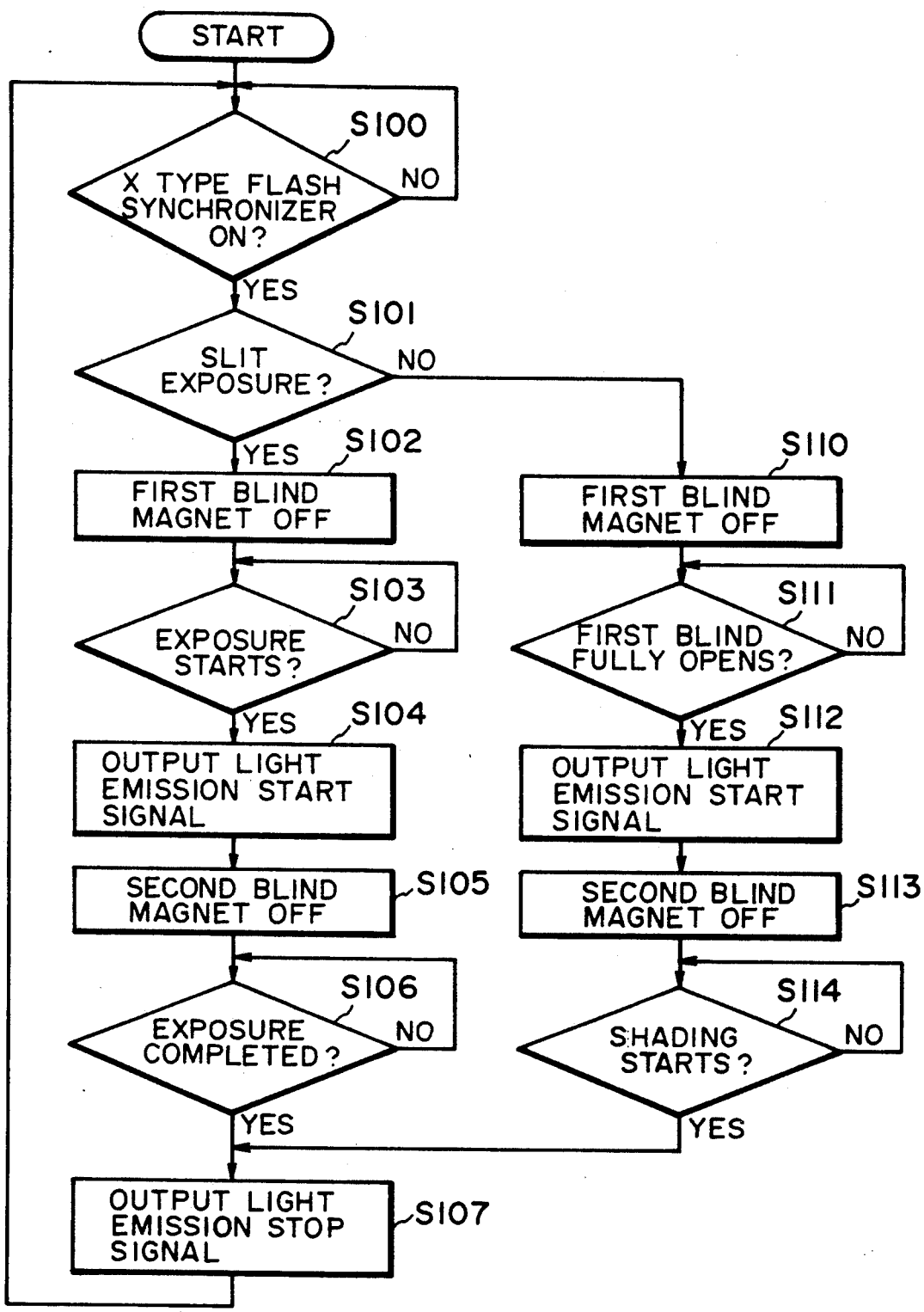
FIG. 3 shows a flow chart of an operation of the embodiment of the present invention.

FIG. 3 shows a flow chart of the control in the release operation of the camera 500 when the electronic flash device 600 conducts the high frequency repetitive light emission. In a step 100 (hereinafter referred to as S100), the release switch SW1 shown in FIG. 1 is monitored. If it is closed (YES), the process proceeds to S101, and if it is not closed (NO), the process returns to S100. In S101, whether the shutter speed set by the shutter speed setting means 11 is for the slit exposure or the full open exposure is determined. If it is the slit exposure (YES), the process proceeds to S102, and if it is the full open exposure (NO), the process proceeds to S110. In S102, the solenoid (not shown) for the shutter leading curtain is deactivated by the leading curtain drive circuit 12 of FIG. 1 and the run of the shutter leading curtain (not shown) is started (at the time $t_0$ of FIG. 2A). In S103, whether the light exposure has been started or not by the run of the shutter leading curtain is determined. If the light exposure has been started (YES), the process proceeds to S104 (at the time $t_1$ of FIG. 2A), and if NO, the process returns to S103. In S104, the camera 500 outputs the light emission start signal to the light emission signal line L100. In S105, the trailing curtain drive circuit 13 deactivates the shutter trailing curtain solenoid in accordance with the shutter speed preset by the shutter speed setting means 11 of FIG. 1. Thus, the shielding of the film (not shown) is started. In S106, the end of the shielding of the film by the shutter trailing curtain is monitored, and when the shielding is ended (the end of the light exposure) (YES), the process proceeds to S107, and if it is not yet ended (NO), the process returns to S106. In S107, the output of the light emission stop signal is controlled so that the light emission stop signal is outputted at the time $t_5$ of FIG. 2A. Then, the process returns to S100.

In S101, the process proceeds to S110 if it is the full open exposure mode. In S110, the solenoid for the shutter leading curtain is deactivated as it is done in the slit exposure mode so that the run of the shutter leading curtain is started. In S111, whether the film is fully opened or not is monitored. If it is fully opened (YES), the process proceeds to S112, and if it is not fully opened (NO), the process returns to S111. In S112, the light emission start signal is outputted (at the time $t_2$ of FIG. 2B), and the process proceeds to S113. In S113, the trailing curtain drive circuit 13 deactivates the solenoid for the shutter trailing curtain in accordance with the shutter speed preset by the shutter speed setting means 11 of FIG. 1. Thus, the shielding of the film is started. In S114, whether the shielding of the film by the shutter trailing curtain has been started or not is determined. If it has been started (YES), the process proceeds to S107, and if it has not been started (NO), the process returns to S114. In S107, the light emission stop signal is outputted at the time $t_4$ of FIG. 2B. Then, the process returns to S100.

When the electronic flash device 600 conducts the normal flashing light emission, the camera 500 is so informed through the light emission mode identification line L102. When this signal is applied, the CPU 10 commands the shutter speed setting means 11 to inhibit the slit exposure. The light emission operation after the closure of the release switch SW1 is the same as that shown in FIG. 2B. When the light emission is controlled by photometering, the light emission stop signal is outputted during the full open time $T_{OP}$.

In accordance with the present invention, the output timings of the light emission start signal and the light emission stop signal are changed between the slit exposure and the full open exposure in accordance with the shutter speed preset by the camera so that non-uniformity in the exposure of the photograph is eliminated over all shutter speeds.

What is claimed is:

1. A camera system including a camera having a focal plane shutter and an electronic flash device cooperable with the camera, comprising:
   setting means for setting an exposure time of the shutter;
   shutter control means for controlling the drive of a leading curtain and a trailing curtain of the shutter in accordance with the set exposure time;

a light emitting tube;

light emission control means for causing the light emitting tube to repetitively emit light during the exposure time of the shutter;

discrimination means for discriminating the set exposure time;

said discrimination means determining that the run of the trailing curtain of the shutter is started prior to full exposure of a film exposure area by the run of the leading curtain of the shutter in the set exposure time, to output a first discrimination signal, and determining that the run of the trailing curtain of the shutter is started after the full exposure of the film exposure area by the run of the leading curtain of the shutter in the set exposure time, to output a second discrimination signal; and timing control means for outputting to said light emission control means a start signal to cause said light emitting tube to repetitively emit light and a stop signal to stop the repetitive light emission of said light emitting tube;

said timing control means outputting the light emission start signal substantially in synchronism with the start of the exposure of the film exposure area by the leading curtain and outputting the light emission stop signal substantially in synchronism with the end of the exposure of the film exposure area by the trailing curtain when said first discrimination signal is outputted;

said timing control means outputting the light emission start signal substantially in synchronism with the full exposure of the film exposure area by the leading curtain and outputting the light emission stop signal substantially in synchronism with the start of shielding of the film exposure area by the trailing curtain when said second discrimination signal is outputted.

2. A camera having a focal plane shutter and cooperable with an electronic flash device for repetitively emitting light by a light emitting tube during an exposure time of the focal plane shutter of the camera, comprising:

setting means for setting the exposure time of the shutter;

shutter control means for controlling the drive of a leading curtain and a trailing curtain of the shutter in accordance with the set exposure time;

discrimination means for discriminating the set exposure time;

said discrimination means determining that the run of the trailing curtain of the shutter is started after full exposure of a film exposure area by the run of the leading curtain of the shutter in the set exposure time, to output a discrimination signal; and timing control means for outputting to said electronic flash device a start signal to cause said light emitting tube to repetitively emit light and a stop signal to stop the repetitive light emission of the light emitting tube;

said timing control means outputting said light emission start signal substantially in synchronism with the full exposure of the film exposure area by the leading curtain and outputting the light emission stop signal substantially in synchronism with the start of shielding of the film exposure area by the trailing curtain when said discrimination signal is outputted.

3. A camera according to claim 2 wherein said discrimination means determines that the run of the trailing curtain of the shutter is started prior to full exposure of the film exposure area by the run of the leading curtain of the shutter in the set exposure time, to output another discrimination signal, and said timing control means outputs the light emission start signal substantially in synchronism with the start of exposure of the film exposure area by the leading curtain and outputs the light emission stop signal substantially in synchronism with the end of exposure of the film exposure area by the trailing curtain when said other discrimination signal is outputted.

* * * * *